(12) United States Patent
Jaworowski et al.

(10) Patent No.: US 7,229,565 B2
(45) Date of Patent: Jun. 12, 2007

(54) CHEMICALLY ASSISTED SURFACE FINISHING PROCESS

(75) Inventors: Mark R. Jaworowski, Glastonbury, CT (US); Xia Tang, West Hartford, CT (US); Clark VanTine Cooper, Glastonbury, CT (US)

(73) Assignee: Sikorsky Aircraft Corporation, Stratford, CT (US)

( * ) Notice: Subject to any disclaimer, the term of this patent is extended or adjusted under 35 U.S.C. 154(b) by 288 days.

(21) Appl. No.: 10/818,059

(22) Filed: Apr. 5, 2004

(65) Prior Publication Data

US 2005/0218117 A1 Oct. 6, 2005

(51) Int. Cl.
*B44C 1/22* (2006.01)
(52) U.S. Cl. ..................................... 216/52
(58) Field of Classification Search ............ 216/52, 216/90
See application file for complete search history.

(56) References Cited

U.S. PATENT DOCUMENTS

| | | | |
|---|---|---|---|
| 3,963,530 A | 6/1976 | Smollett et al. | |
| 4,491,500 A * | 1/1985 | Michaud et al. | 216/87 |
| 4,705,594 A | 11/1987 | Zobbi et al. | |
| 4,818,333 A | 4/1989 | Michaud | |
| 4,844,749 A | 7/1989 | Foreman et al. | |
| 4,906,327 A | 3/1990 | Michaud et al. | |
| 5,047,095 A * | 9/1991 | Geke et al. | 148/259 |
| 5,051,141 A | 9/1991 | Michaud et al. | |
| 5,104,463 A | 4/1992 | Menke | |
| 5,158,623 A | 10/1992 | Michaud et al. | |
| 5,158,629 A | 10/1992 | Zobbi | |
| RE34,273 E | 6/1993 | Phillips et al. | |
| 5,503,481 A | 4/1996 | Hashimoto et al. | |
| 5,514,226 A | 5/1996 | Terrat et al. | |
| 5,540,788 A | 7/1996 | Defalco et al. | |
| 5,873,770 A | 2/1999 | Hashimoto | |
| 6,211,132 B1 * | 4/2001 | Pierce et al. | 510/365 |
| 2002/0088773 A1 | 7/2002 | Holland et al. | |
| 2002/0106978 A1 * | 8/2002 | Michaud et al. | 451/48 |
| 2005/0158234 A1 * | 7/2005 | Dobbs | 423/440 |

* cited by examiner

*Primary Examiner*—Parviz Hassanzadeh
*Assistant Examiner*—Roberts Culbert
(74) *Attorney, Agent, or Firm*—Carlson, Gaskey & Olds

(57) ABSTRACT

A method of surface refinement for refining a first roughness of a surface of a component to a second roughness. The method includes wetting the first roughness surface with an aqueous mixture that includes solid media. The aqueous mixture chemically alters the surface forming a chemically converted surface. Relative movement between the chemically converted surface and the solid media produces the refined second roughness.

4 Claims, 1 Drawing Sheet

CHEMICALLY ASSISTED SURFACE FINISHING PROCESS

BACKGROUND OF THE INVENTION

Figure 1:
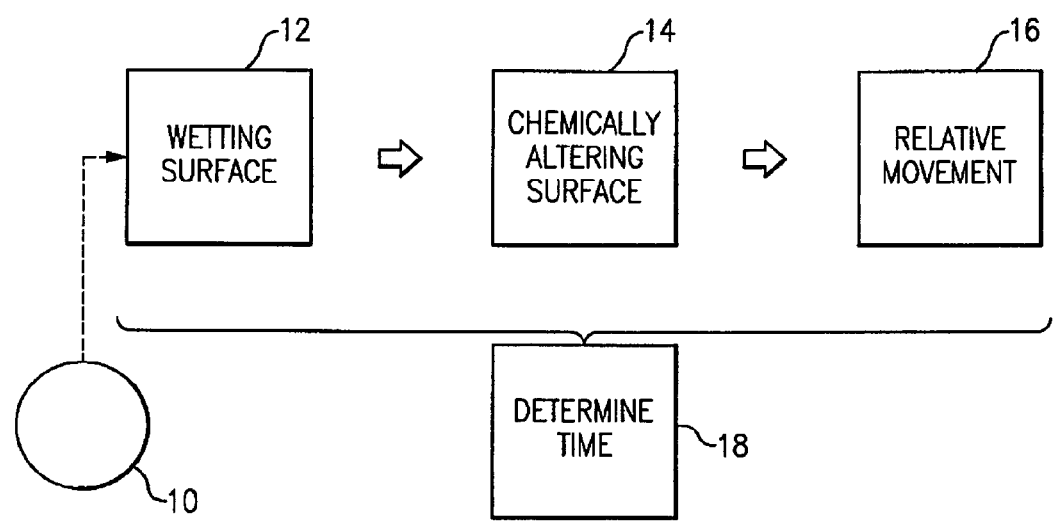

This invention relates to a method of surface finishing and, more particularly, to a vibratory method for producing a refined surface roughness on a metal component.

For selected metal components such as a gear, bearing, or spline of a power transmission, it is desirable to refine the surfaces of the components. A component having a refined surface provides greater durability from the increased contact area and lower contact stress that results from the surface refinement. In addition, the lambda ratio, $\lambda$, defined to be the lubricant film thickness divided by the composite surface roughness, increases as the surface roughness is reduced, which results in greater surface durability of gear and bearing components.

Conventionally, grinding and polishing equipment is used to improve the surface finish of a metal component. Grinding and polishing provide only a limited degree of surface refinement, often leave undesirable particles on or impregnated in the metal surface, and generally require long periods of time. Although effective in coarse surface refinement, grinding and polishing may often be unfeasible for achieving a highly refined surface, which provides significant benefits for power transmission power throughput. Grinding and polishing are subject to certain limitations or increased costs in the preparation of surfaces that present complex shapes, such as the working surface of a power-transmission gear.

Another conventional surface finishing method includes use of a chemical mixture and vibration to refine metal surfaces. The chemical mixture includes substances such as oxalic acid, sulfuric acid, chromates, phosphates, stabilizers, wetting agents, abrasive particles, or mixtures thereof. Vibratory equipment holds the chemical mixture and metal components. The rough surfaces of the components are wetted with the chemical mixture which reacts with a surface layer of the metal component to form a soft reaction layer. The vibratory equipment agitates the component and chemical mixture. The agitation produces relative movement between the component and the abrasive particles and continuously oxygenates the chemical mixture. The relative movement between the components and abrasive particles scours higher elevations (peaks) of the soft reaction layer away. The scouring occurs primarily on the most elevated portions (peaks) and results in refinement of the surface. Although this is effective for surface refinement, an undesirable residual soft reaction layer remains on the metal component surface. Furthermore, the chemical substances, especially chromate and phosphate containing substances may entail undesirable waste treatment management.

A related conventional finishing method utilizes an additional burnishing step to remove the remaining soft reaction layer and neutralize the chemical mixture. The burnishing method includes use of a separate second solution. The second solution is an inert aqueous alkaline soap mixture that includes burnishing particles. The metal component is agitated in the inert mixture after the chemical mixture surface refinement step to physically remove the soft reaction layer and neutralize remaining chemical mixture from the previous refinement step. The abrasive action of the burnishing particles in inert mixture, however, can be counterproductive to surface refinement. Furthermore, the added burnishing step using a separate second solution can add significantly to the expense and time of the entire surface finishing process.

Another conventional burnishing method utilizes an acid, such as hydrochloric acid, to dissolve the soft reaction layer. Use of hydrochloric acid poses concerns, such as increasing the risk of hydrogen embrittlement of the metal, particularly iron and its alloys. Also, if not controlled properly the acid may etch the surface of the component and negate the surface refinement. Furthermore, strong acids may entail undesirable waste treatment management.

Despite grinding, polishing and other existing conventional vibratory methods, a demand remains for an inexpensive and convenient surface refining process. Accordingly, it is desirable to provide a convenient surface refining method utilizing a single mixture.

SUMMARY OF THE INVENTION

To achieve surface refinement of a component, a surface of the component having a first roughness is wetted with an aqueous mixture. The aqueous mixture includes a liquid component and a solid media component. The aqueous mixture chemically alters the surface, forming a chemically converted surface. Relative movement between the chemically converted surface and the solid media is generated to produce a less coarse surface.

In another method according to the present invention, a refined second roughness is produced by stripping at least part of the chemically converted surface. Primarily the most elevated portions (peaks) of the chemically converted surface topography are stripped. In other examples, the refined second roughness is produced by stripping away essentially all of the chemically converted surface.

In another method according to the present invention, the aqueous mixture includes a basic pH, controlled by including an alkaline metal hydroxide. In some examples, the pH level is one factor that determines how much time the component spends being agitated or how long the component is exposed to the aqueous mixture.

In another method according to the present invention, the aqueous mixture includes dissolved molybdenum or a dissolved molybdenum compound. The molybdenum forms as part of the composition of the chemically converted surface and in one example provides corrosion protection of the underlying component.

The solid media can also include an intermetallic molybdenum compound that refines the chemically converted surface and provides a source of molybdenum for dissolving in the aqueous mixture.

In another method according to the present invention, the environment of the component is heated to promote more rapid chemical altering.

The method of the present invention provides a convenient surface refining method utilizing a single mixture.

The various features and advantages of this invention will become apparent to those skilled in the art from the following detailed description of the currently preferred embodiment.

DETAILED DESCRIPTION OF THE PREFERRED EMBODIMENT

In certain devices such as power transmissions, components that have refined surfaces are advantageous for realizing greater surface durability and/or greater power density. Especially for components that are in contact with one another such as gears, bearings, or spline shafts and the like, refined contact surfaces increase the effective contact area, which reduces the contact stress and increases component durability, and increases the important lambda ratio, λ.

FIG. 1 illustrates a method of surface refinement for these and other such components. The component 10 has a surface that is generally metallic, which may include metal, oxidized metal, debris, oil, or surface characteristics from metal working operations. The metallic surface of component 10 includes a first roughness and it is desirable to produce a refined second roughness. Generally, roughness refers to the topographical roughness of the surface and may be measured by conventional methods known to those skilled in the art. An example feature that influences roughness is the difference in surface elevation from location to location on the surface. A refined surface is defined herein as being smoother than the original surface. That is, the difference in surface elevations from location to location is reduced. In one example, the surface refinement method refines the surface of a component from the first roughness to a second roughness. The second roughness is any desired level of roughness less than the original.

A step 12 to achieve surface refinement of the component 10, is wetting the surface of the component with an aqueous mixture. The aqueous mixture at least includes a liquid component and a solid media component. The solid media component includes conventional media known to those of ordinary skill in the art such as but not limited to quartz, granite, alumina, silicon carbide, iron oxide, and media of the like. Optionally, the solid media includes a matrix of porcelain, plastic or naturally-derived materials such as nut shells, grain husks, or processed starches used by themselves or in combination with inorganic abrasive particles. Wetting of the component surface includes submerging the component in a bath containing the aqueous mixture. However, in other examples the amount of aqueous mixture used is only enough to wet the surface and not enough to submerge the entire component. Preferably, the wetting occurs over the entire surface to ultimately provide a homogeneously refined surface.

A step 14 of refining the surface of the component 10 is chemically altering the surface of the component 10 to form a chemically converted surface. That is, the surface of the component 10 is chemically changed, not just provided with a layer or coating deposited on the surface. For example, chemically altering a metallic iron or steel surface of component 10 includes converting the iron to iron oxide. Preferably the iron oxide is magnetite having the composition $Fe_3O_4$. The sequence of chemical reactions that result in magnetite is essentially free of elemental oxygen and generally includes the reaction of iron ions with water to produce $Fe_3O_4$ and hydrogen.

A step 16 of refining the surface of the component 10 includes generating relative movement between the chemically converted surface and the solid media to produce a second roughness on the component 10. It is to be understood that any type of surface refinement equipment may be utilized to generate the movement. Preferably, vibratory equipment will be used. The vibratory equipment agitates the component 10, producing relative movement between component 10 and the aqueous mixture. However, in other examples the aqueous mixture is vibrated relative to the component 10.

In a step 12, the aqueous mixture includes a basic pH. Preferably the pH level is about 13, although pH levels closer to neutral could be utilized. In some examples the pH level is controlled by including an alkaline metal hydroxide in the aqueous solution. Periodic Table Group 1 and Group 2 hydroxides in aqueous concentrations between about 0.1 wt % and 50 wt % are preferred. An aqueous mixture having a basic pH generally has fewer concerns for waste treatment management compared to prior art mixtures, especially prior art mixtures containing chromium and phosphorous.

The aqueous mixture includes dissolved molybdenum or a dissolved molybdenum compound. The molybdenum is added in the form of a salt of molybdate acid such as a Periodic Table Group 1 or Group 2 salt. Group 1 molybdate salts are preferred for yielding higher concentrations in the range of 100 ppm to about 10,000 ppm in the aqueous mixture. Group 2 molybdate salts are preferable for yielding lower concentrations in the range of about 0.1 ppm to 1000 ppm. The aqueous mixture including dissolved molybdenum is expected to have a pH level of between about 8 and 11, although other pH levels are possible. In chemically altering the surface, the molybdenum forms part of the composition of the chemically converted surface. In one example, the molybdenum chemically converted surface composition includes molybdenum iron oxides. Molybdenum in the chemically converted surface provides corrosion protection of the underlying component.

The solid media of the aqueous mixture can include an intermetallic molybdenum compound that refines the chemically converted surface and provides a source of molybdenum for dissolving in the aqueous mixture. Preferably the intermetallic molybdenum is a Periodic Table Group 2 metallic molybdenum such as calcium, strontium, barium or mixtures thereof. A Group 2 metallic molybdenum compound has lower solubility of molybdenum in the aqueous mixture than Group 1 molybdenum compounds. The low solubility allows the Group 2 metallic molybdenum compound to be utilized simultaneously as a solid media and source of molybdenum for dissolving in the aqueous mixture. Group 1 or Group 2 intermetallic molybdenum compounds are preferred; however, other intermetallic molybdenum compounds could be used including zinc molybdate, strontium molybdate, and the like.

In a step 14, the environment of the component 10 is heated to a temperature between about 72° F. and about 280° F. to promote chemical alteration of the surface. In one preferred example the temperature is between about 180° F. and about 200° F. to promote rapid chemical altering. It should be understood that a variety of factors such as but not limited to the aqueous mixture pH, the type of metal forming the component, and the degree of surface roughness influence the environment temperature that is selected. Utilizing a temperature in the 72° F. to 280° F. range provides significant energy use advantages over higher temperatures required for use of some prior art mixtures and mixtures including at least one molten salt reagent.

In another example, the environmental temperature is maintained at about room temperature, 72° F., and the aqueous mixture includes selenium. The selenium aqueous mixture is effective in converting the surface of the component 10 to a chemically altered surface at room temperature, although higher temperature could be utilized also. The chemically altered surface includes selenium in the composition and generally has a lower level of passivation than chemically altered surfaces from the alkaline metal hydroxide aqueous mixtures.

In a step 16, a refined second roughness is produced by stripping at least part of the chemically converted surface away. The solid media contacts the chemically converted surface during the relative movement. The contact scours primarily the most elevated portions (peaks) of the chemically converted surface topography to expose the component surface from where the chemically converted surface was stripped. The chemically converted surface continuously repairs itself through continuous wetting by the aqueous mixture, chemically altering those portions that have been stripped away by the scouring contact of the solid media. By continuously stripping away primarily the most elevated portions (peaks) of the chemically converted surface, the refined second roughness is produced. In other examples, the refined second roughness is produced by stripping away essentially all of the chemically converted surface.

The surface refinement method may include a step 18 in conjunction with other steps. The step 18 includes determining an amount of time of relative movement of the component or time that the component is exposed to the aqueous mixture. The determination of time is based on the pH. The pH level controls the refinement process. That is, the ability of the aqueous mixture to chemically alter the surface is adjusted by changing the pH level of the aqueous mixture. In another example, the pH level is a factor that determines how much time the component 10 spends being agitated or how long the component 10 is exposed to the aqueous mixture. In still other examples, the temperature is a factor that determines the amount of time of relative movement of the component or time that the component is exposed to the aqueous mixture. That is, increasing the temperature reduces the agitation time and aqueous mixture exposure time.

Although a preferred embodiment of this invention has been disclosed, a worker of ordinary skill in this art would recognize that certain modifications would come within the scope of this invention. For that reason, the following claims should be studied to determine the true scope and content of this invention.

We claim:

1. A method of surface refinement of a component comprising a surface with a first roughness comprising the steps of:
   (a) wetting the surface of the component with an aqueous mixture comprising solid media, wherein the solid media comprises an intermetallic molybdenum compound that includes a zinc molybdate compound;
   (b) chemically altering the surface of the component with the aqueous mixture to form a chemically converted surface; and
   (c) generating relative movement between the chemically converted surface and the solid media to strip at least part of the chemically converted surface away to produce a second roughness on the component.

2. The method as recited in claim 1, wherein the aqueous mixture comprises a pH of about 13.

3. The method as recited in claim 1, wherein the aqueous mixture comprises selenium.

4. A method of surface refinement of a component comprising a surface with a first roughness comprising the steps of:
   (a) wetting the surface of the component with an aqueous mixture comprising solid media, wherein the solid media comprises an intermetallic molybdenum compound that includes a Periodic Table Group 1 or Group 2 molybdate salt;
   (b) chemically altering the surface of the component with the aqueous mixture to form a chemically converted surface: and
   (c) generating relative movement between the chemically converted surface and the solid media to strip at least part of the chemically converted surface away to produce a second roughness on the component.

\* \* \* \* \*